United States Patent [19]

Dieterle

[11] Patent Number: 5,486,691
[45] Date of Patent: Jan. 23, 1996

[54] MONITORING APPARATUS IN MACHINES

[75] Inventor: Gerhard Dieterle, Simonswald, Germany

[73] Assignee: Erwin Sick GmbH Optik–Eletronik, Waldkirch, Germany

[21] Appl. No.: 132,087

[22] Filed: Oct. 5, 1993

[30] Foreign Application Priority Data

Oct. 7, 1992 [DE] Germany ............... 42 33 810.7

[51] Int. Cl.⁶ .................. B62D 1/24; B60T 7/16
[52] U.S. Cl. .......... 250/221; 340/555; 340/556; 340/557
[58] Field of Search .............. 250/221; 340/555, 340/556, 557

[56] References Cited

U.S. PATENT DOCUMENTS 4,514,625  4/1985  Heiland ................... 340/556

FOREIGN PATENT DOCUMENTS 0391883  10/1990  European Pat. Off. .......... 340/555
0180973  12/1983  Japan ......................... 340/556

*Primary Examiner*—William L. Sikes
*Assistant Examiner*—Fetsum Abraham
*Attorney, Agent, or Firm*—Townsend and Townsend and Crew

[57] ABSTRACT

A monitoring apparatus for working machines (16) has a light curtain (11) at the entry side (14) of the working space (13). A rotational scanner (12) is also provided which scans at least the dangerous zone of the working space in a horizontal plane in order to also protect body parts of operators which enter into the working space (13).

17 Claims, 2 Drawing Sheets

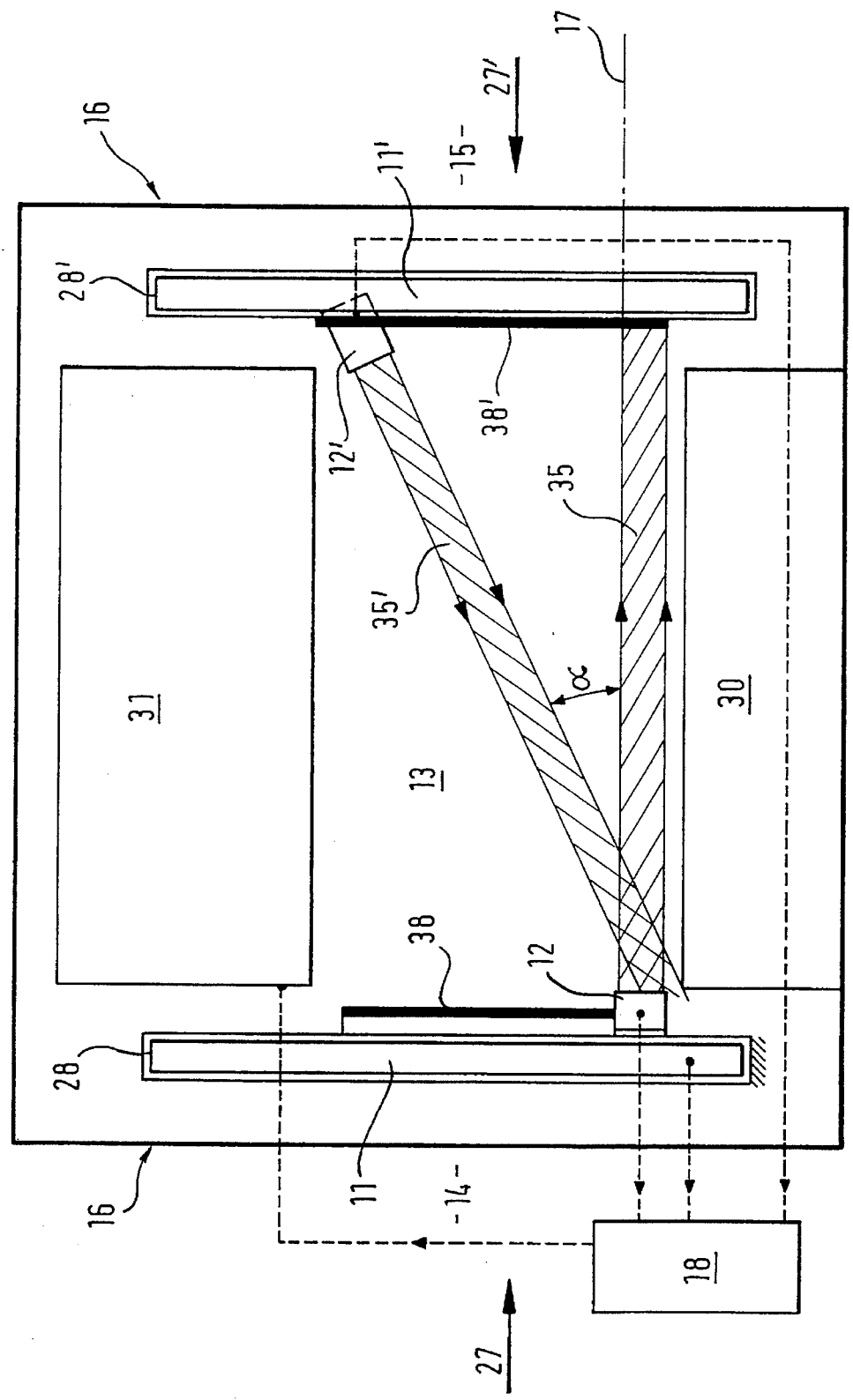

MONITORING APPARATUS IN MACHINES

BACKGROUND OF THE INVENTION

The invention relates to a monitoring apparatus in working machines having a working space into which body parts of an operator or other insertable parts must enter from at least one entry side for a period of time and in which working processes take place which endanger the body parts of the operator of the other insertable parts.

Conventional monitoring apparatus have at least one protective means arranged outside of the working space which is triggered, preferably unconsciously, by one or more body parts of the operator or by one or more insertable parts before entry into the working space takes place, and which on being triggered initiates, via an evaluation circuit, a stop signal or switch-on prevention signal for the machine.

The protective means can operate without contact and can for example, be formed as a light curtain (German application, Pub. No. 21 17 500) or also as a mechanical curtain with end switches (sliding door or the like). A further possibility consists in the person operating the working machine having to actuate a switch with both hands (two-handed switching) in order to initiate a machine cycle, so that it is impossible for the operator to encroach with one of the hands into the working space which becomes dangerous on switching on of the machine.

With regard to the machines one primarily thinks of large machines such as for example presses, pressure diecasting machines, blow molding machines and the like in which the requirement exists, in order to increase the economy, that the protective means which operates without contact should control the machine while being tied to the operating cycle thereof and to increase the safety of the plant.

With large tool installation spaces and low table height, the cycle-bound controlling of the machine using protective devices is, however, problematic because it is possible to walk within the tool installation spaces. The protective devices which are normally provided admittedly prevent starting of the machine or cause the stopping of the machine on being initiated. However, if the person leaves, for example, a protective device which operates without contact in the direction of the tool installation space within the predetermined cycle time, an undesired and dangerous machine start takes place. In the case of the presence of a two-handed switch, a person could initiate a machine start by orderly actuation of the two-handed switch and a second person could simultaneously enter into the dangerous working space. For this reason the controlling of large machines or large presses without additional protective means for monitoring the working space, in particular the tool installation space, is dangerous.

SUMMARY OF THE INVENTION

The object of the invention is to provide a monitoring apparatus of the initially named kind in which the working space or tool installation space is also reliably monitored for the presence of body parts of the operator or other inserted parts by means which are space-savingly arranged and protected against damage.

In order to satisfy this object, the invention provides an apparatus comprising a rotational light sensor having a transmitter part and a receiver part which scans at least the dangerous region of the working space in which the body parts of the operator or the other inserted parts can be located in a plane which has an angle from 0° to 60° in particular from 0° to 45° and preferably approximately 0° to the horizontal plane. The rotational light sensor is also connected to the evaluation circuit which monitors the reflection signals detected by the receiver part of the rotational sensor to see whether they originate from body parts or other inserted parts located in the dangerous region, and, on the occurrence of an entry signal, initiate a stop signal or switch-on prevention signal for the working machine.

It is important that both the protective means arranged outside of the working space and also the rotational scanner are active during the dangerous movement of the machine and can bring about a stopping of the machine on being triggered.

The invention thus describes a secondary protective measure which is provided in addition to the primary protective means for the monitoring of working spaces, for example, interior spaces of machines or the tool installation space, so that a cycle-bound controlling of the machine is possible without the above named risks. The monitoring of the tool installation space thereby takes place additionally by means of a rotational sensor or scanner in which the scanning sectors and also the scanning range can be programmed. The scanning range, i.e. distance and/or width can for example be set in the manner which is known from German application Pub. No. 35 13 671. A further possibility for setting the scanning range consists in that the transit time of a light beam emerging from the rotational scanner up to the reflective article and back to the rotational scanner is measured. Suitable transit time measurement methods are for example described in German application Pub. No. 24 29 062 and German application Pub. No. 40 02 356. By means of such arrangements articles or inserted parts, presence within the scanning range can be recognized. The advantage of such light scanners with preferably adjustable scanning range, which is in any event restricted, lies in the fact that reflective articles located outside of the working space, which likewise reflect the light of the light scanner, cannot be recognized as inserted parts. Rotational scanners with restricted scanning range are also particularly suited for monitoring only the spatially narrowly limited working space of the dangerous working machine.

The rotational scanner is preferably mounted outside of the tool installation space and is expediently displaceably mounted in the vertical direction, so that the sector-like protective field can be set to the different tools that are used. The entire tool installation space is monitored in one plane from the appropriate position.

In accordance with the invention, a cycle controlled machine start is only possible when the vertical and horizontally arranged protective fields are free. After the start has taken place, the protection is ensured by the vertically arranged protective curtain, which is preferably a light curtain.

The advantages of this additional protective means with a rotational scanner which operates without contact for the monitoring of the tool installation space are as follows:

The monitoring apparatus can be universely used and can be adapted without problem to different tool installation spaces;

free access to the tool installation space and also to the tool itself;

the apparatus can be installed at a protected location in front of the machine tool inner space directly behind the vertically arranged transmitter/receiver part or reflection part of the light curtain. Thus the apparatus is extensively protected against mechanical damage or heavy contamination by greases or oils;

no additional monitoring or safety devices need to be mounted in the entire inner space of the machine or tool installation space;

no risk even when several people are working on a machine;

no increased control complexity.

BRIEF DESCRIPTION OF THE DRAWINGS

The invention will be described in the following by way of example and with reference to the drawing in which are shown:

FIG. 2 illustrates a cut away side view of the subject of FIG. 1 with a second light curtain and a second sectorial scanning zone being additionally provided.

In both figures, the same reference numerals are used to designate components which correspond to one another.

DESCRIPTION OF THE PREFERRED EMBODIMENTS

Figure 1:
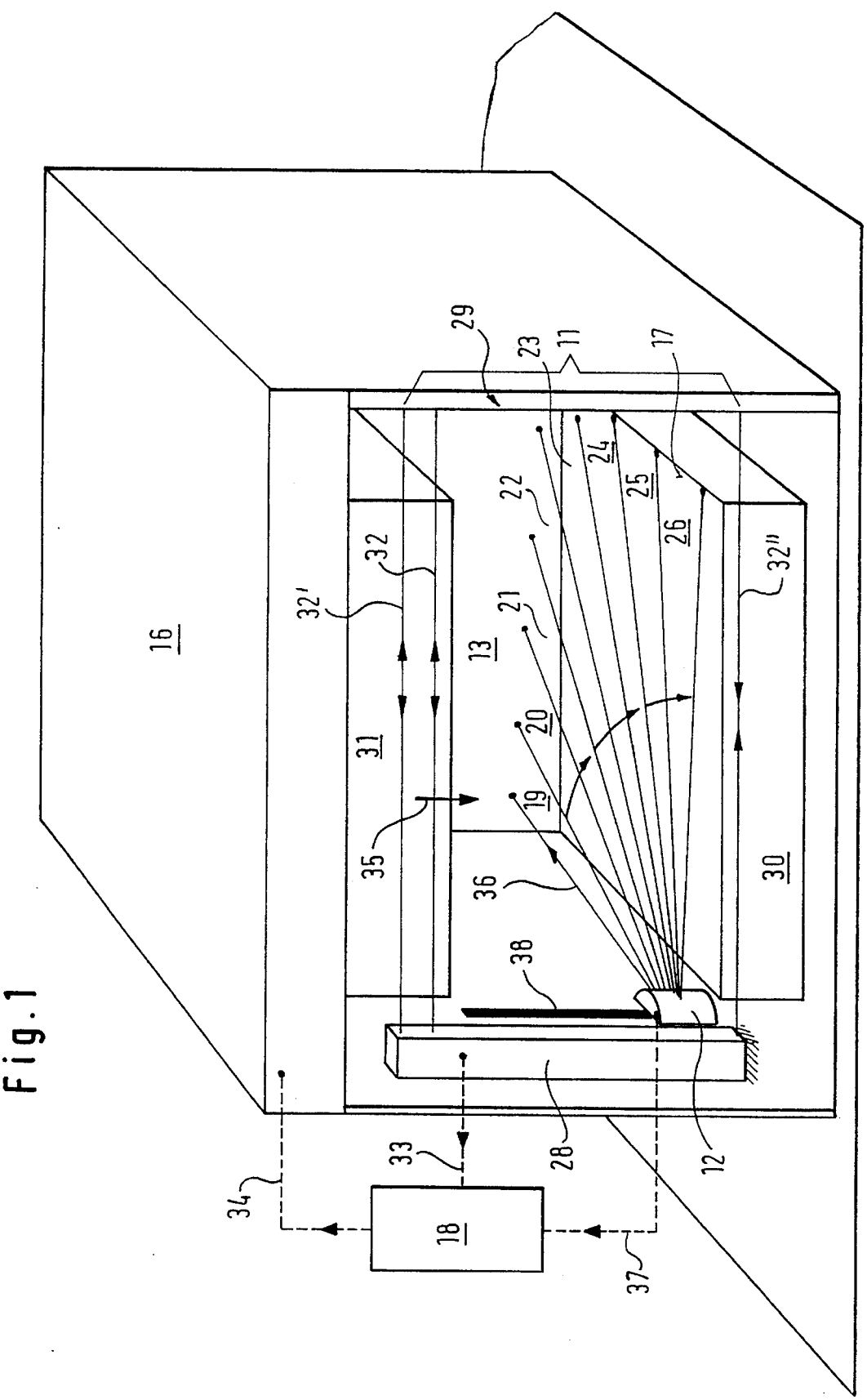
FIG. 1 illustrates a schematic perspective view of a working machine with a dangerous working space at which a vertical light curtain and a horizontal sector monitoring zone are provided, with the evaluation circuit and the dashed control lines being indicated.

In FIG. 1 a working machine 16 has a substantially horizontal clamping plate or mounting table 30 above which there is located a working space 13, in particular a tool installation space.

Above the working space 13, a ram or slide 31 is provided which can be caused to execute an up and down movement and which can be lowered downwardly to the clamping plate 30 after the installation of the non-illustrated tools, whereby the working processes which are to be carried out by the working machine 16 can be executed.

During the downward movement of the ram or slide 31, neither body parts of the operator nor other inserted parts (for example robots) may be located within the working space 13 because otherwise injuries, damage or indeed death can occur.

It is already known to provide a light curtain 11 at the entry side to stop the machine or to prevent a machine stop on an encroachment or entry into the working space, with the light curtain having a light transmitter/receiver part 28 at one end of the entry side and a reflection part 29 at the opposite side. The light transmitting/receiving part 28 transmits a scanning beam 32 to the oppositely disposed reflection part 29 with the scanning beam 32 executing a parallel scanning movement in the direction of the arrow 35 over the entry side, for example from the top to the bottom. The uppermost boundary ray of the light curtain 11 is designated with 32—the lowermost with 32".

If an operator reaches through the light curtain 11 into the working space 13, the scanning beam 32 is interrupted at the corresponding position and the transmitter/receiver part 28 indicates this to the evaluation circuit 18 via a control line 33. The evaluation circuit 18 then transmits a switch-off signal via a further control line 34 to the working machine 16, whereupon, for example, the downward movement of the ram 31 is abruptly stopped. It is, however, problematic with large machines, and with the ram in the upper position, when an operator walks into the working space 13 and thereby departs from the protective curtain 11. In this case, a free light curtain 11 is indicated by the sender/transmitter part 28 to the evaluation circuit 18 and the execution of the next working cycle of the working machine 16 is allowed to commence.

In order to protect the operator in the above described case, a rotational light scanner 12 is provided in accordance with the invention directly behind the transmitter/receiver part 28 of the light curtain 11 and transmits a light beam 36 in the horizontal direction which scans the working space in the direction of the curved arrow in FIG. 1. The light scanner 12 is set to a specific scanning range. The end of the scanning range is indicated in FIG. 1 by small circles at the end of the light beam 36. A very simple practical realization of a rotational scanner 12 of this kind could consist in allowing the light scanner with an adjustable scanning distance as known from German application Pub. No. 35 13 671 to rotate or pivot to and fro about a vertical axis.

In this manner the light beam 35 scans the sectors 19, 20, 21, 22, 23, 24, 25 and 26 in FIG. 1 in series, with the entire working space 13 being swept through in one plane. The scanning width is set so that detection is carried out throughout the entire depth of the working space 13.

The light scanner 12 is also connected via control line 37 to the evaluation circuit 18. The light scanner 12 has a transmitter and receiver part. As soon as a light reflecting body part or inserted part is located in one of the sectors 19 to 26, the light scanner 12 transmits a corresponding detection signal via the control line 37 to the evaluation circuit 18 which then transmits a switch-on prevention signal to the working machine 16 via the control line 34. Thus, as long as a body part of an operator or an inserted part is located within one of the sectors 19 to 26, the switching on of the working machine 16 is precluded.

As the scanning width of the rotational light scanner 12 is restricted—as is also indicated by the small circles at the end of the light beams—the monitoring region of the rotational light scanner 12 can be strictly restricted to the extent of the working space 13, so that reflective articles located outside of the working machine cannot prevent the switching on of the working machine 16.

In order to be able to set the light scanner 12 to different requirements it is vertically adjustably mounted on a vertical bar 38, so that the sectorial scanning range 19 to 26 can be set at different heights.

In accordance with FIG. 2, the working space 13 is not only accessible from the front entry side 14 in the direction of the arrow 17, but also from the rear in the direction 27' via a further entry side 15. For this reason, a light curtain 11'0 analogous to the light curtain 11 at the front side is also provided in the embodiment of FIG. 2 at the rear side of the working machine 16.

Although the rotational light scanner 12 would in fact be adequate for the monitoring of the working space 13, i.e. of the tool installation space, a further rotational light scanner 12' is provided in the embodiment of FIG. 2 which is vertically adjustably located on carrier bar 38' directly behind the further curtain 11'. In contrast to the rotational light scanner 12 the scanning plane of the rotational light scanner 12' is however inclined at an angle of ca. 30° relative to the horizontal plane 17.

With this configuration adaptation to very different monitoring problems is possible.

The horizontal light scanner 12 and the oblique rotational light scanner 12' of FIG. 2 can be used jointly or individually depending on which monitoring task has to be met in the working space 13.

It is important that the evaluation circuit 18 first initiates a cycle of the working machine 16 when both the light curtains 11, 11' and also the sectorial regions which are swept over by the sectorial scanning beams 35, 35' are free of inserted parts or body parts of the operator. Thereafter the evaluation circuit 18 only reacts to insertion signals from the light curtains 11, 11' but no longer however to such signals from the sectorial scanning regions with the light beams 35, 35' since these are also interrupted by the downwardly moving ram or slide 31, or the tools secured thereto, and would lead to stopping of the working machine 16 at the incorrect time if the light scanners 12, 12' were not set out of operation.

The rotational scanners 12 and/or 12' respectively are made active again at the latest when a stop signal or start prevention signal is again triggered by the evaluation circuit 18 for a working machine 16 by an encroachment into one of the light curtains 11, 11'. The rotational scanners 12 and/or 12' then deliver, via the evaluation circuit 18, a switch on prevention signal to the working machine 16 when entry or encroachment into the sectorial scanning range 19 to 26 occurs.

A working machine operating with a cyclically upwardly and downwardly moving ram or slide 31 can be cyclically controlled in such a way that an operator, after mounting of the desired tools, brings a workpiece into the working space 13 and then leaves the sectorial scanning region 19 to 26 and also the light curtain 11. The change in state in the receiver part of the light curtain 11 on the operator leaving the light curtain then leads automatically to the starting of the machine, i.e. to the downward movement of the ram 31, provided the rotational scanner 12 does not indicate an encroachment. During the dangerous movement of the working machine, 16 both the protective means 11, 11' and also the rotational scanners 12, 12' must in any event be active and be able to cause a machine stop via the evaluation circuit 18. In the case of a press with an upwardly and downwardly moving ram or slide 31, the rotational scanner 12, 12' will be made inactive—as already explained above— during the downward movement of the ram or slide 31. However, as soon as the ram or slide is again located in its upper, non-dangerous position, the rotational scanner 12, 12' is activated again. This activation must take place at the latest when a body part of an operator or another inserted part encroaches through the light curtain 11, 11' into the working space 13.

There are however also machines with dangerous working spaces such as for example injection molding machines, where the horizontal scanning range 19 to 26 of the rotational scanner 12, 12' is not interrupted during operation by any machine parts. In the case of such an application the rotational scanner 12, 12' remains active during the entire working time of the machine.

In place of the light curtain 11, a mechanical curtain, for example a sliding door, can also be provided which actuates an end switch in the closed state which delivers a free-to-start signal to the working machine 16 via the evaluation circuit 18. This free-to-start signal can however only take effect when the rotational scanner 12, 12' simultaneously delivers such a free-to-start signal via the evaluation circuit 18. If the sliding door is opened, the end switch is actuated and triggers a machine stop signal or a switch-on prevention signal via the evaluation circuit 18.

Not only light curtains with a scanning beam which periodically sweeps over the protected surface can act as a protective means which operates free of contact, but rather light grids can also be used. Even a simple light barrier can if necessary take on the function of the protective means of the invention.

Moreover, while a rotational scanner is the preferred additional security device this term will be understood to include also any other form of rotational sensor system.

I claim:

1. A monitoring apparatus for a machine of the type having a working space in which dangerous working processes occur, the working space having at least one entry side through which an operator can enter or a work tool can be inserted, the apparatus comprising:

at least one protective light curtain arranged on the entry side of the working space and having a transmitter for transmitting light, a reflector for reflecting the light and a receiver for detecting the reflected light;

an evaluation circuit operatively coupled to the receiver and having a switch for terminating the dangerous working processes of the machine when the operator or the work tool passes by the light curtain; and a rotational light sensor having a transmitter for transmitting light through the working space and a receiver for detecting the transmitted light, the rotational light sensor being rotatably coupled to the working space so that the light is scanned across at least a portion of the working space over a scanning plane having an angle of 0° to 60° with respect to a horizontal plane, the receiver being coupled to the evaluation circuit such that the switch terminates the dangerous working processes when the operator or the work tool are located within the scanning plane.

2. The monitoring apparatus of claim 1 wherein the protective light curtain has a first side facing an exterior of the working space and a second side facing the working space, the rotational sensor being arranged on the second side of the light curtain.

3. The monitoring apparatus of claim 2 wherein the rotational sensor is disposed adjacent the light curtain transmitter.

4. The monitoring apparatus of claim 2 wherein the rotational sensor is disposed adjacent the light curtain reflector.

5. The monitoring apparatus of claim 1 further including means, operatively coupled to the rotational sensor, for establishing a predetermined sensing range such that the receiver of the rotational sensor only detects signals from objects within the predetermined sensing range.

6. The monitoring apparatus of claim 1 wherein the evaluation circuit includes means for establishing a predetermined sensing range such that the switch only terminates the dangerous working processes when the operator or the work tool are located within the predetermined sensing range.

7. The monitoring apparatus of claim 1 wherein the scanning plane is divided into a plurality of sectors, the evaluation circuit including means for determining in which sector the operator or work tool is located.

8. The monitoring apparatus of claim 1 wherein the rotational sensor is located outside of the working space.

9. The monitoring apparatus of claim 1 wherein the rotational sensor is located near a corner of the working space.

10. The monitoring apparatus of claim 1 wherein the rotational sensor scans over substantially the entire working space.

11. The monitoring apparatus of claim 1 wherein the rotational light sensor and the protective light curtain each have a triggered state when an object is detected and a non-triggered state when an object is not detected, the evaluation circuit includes means for preventing operation of the dangerous working processes when either the rotational light sensor or the protective light curtain are in the triggered state.

12. The monitoring apparatus of claim 11 wherein the evaluation circuit automatically starts the dangerous working processes when the protective light curtain moves from the triggered state to the non-triggered state provided that the rotational light sensor is in the non-triggered state.

13. The monitoring apparatus of claim 12 wherein the evaluation circuit automatically inactivates the rotational sensor when the dangerous working processes operate so that the evaluation circuit reacts only to signals from the protective light curtain.

14. The monitoring apparatus of claim 13 wherein evaluation circuit automatically reactivates the rotational sensor when the protective light curtain moves into the triggered state.

15. A monitoring apparatus for a machine of the type having a working space in which dangerous working processes occur, the working space having at least one entry side through which an operator can enter or a work tool can be inserted, the apparatus comprising:

at least one protective means, arranged outside of the working space, for detecting the operator or the work tool before entry into the working space;

an evaluation circuit operatively coupled to the protective means and having a switch for terminating the dangerous working processes of the machine when the operator or the working part is detected by the protective means; and a rotational light sensor having a transmitter for transmitting light through the working space and a receiver for detecting the transmitted light, the rotational light sensor being rotatably coupled to the working space so that the light is scanned across the working space over a scanning plane having an angle of 0° to 60° with respect to a horizontal plane, the rotational light sensor being vertically adjustable with respect to the horizontal plane such that the scanning plane can be vertically adjusted, the receiver being coupled to the evaluation circuit such that the switch terminates the dangerous working processes when the operator or the work tool are located within the scanning plane.

16. A monitoring apparatus for a machine of the type having a working space in which dangerous working processes occur, the working space having at least one entry side through which an operator can enter or a work tool can be inserted, the apparatus comprising:

at least one protective light curtain arranged on the entry side of the working space and having a transmitter for transmitting light, a reflector for reflecting the light and a receiver for detecting the reflected light;

an evaluation circuit operatively coupled to the receiver and having a switch for terminating the dangerous working processes of the machine when the operator or the work tool passes by the light curtain; and a rotational light sensor having a transmitter for transmitting light through the working space and a receiver for detecting the transmitted light, the rotational light sensor being rotatably coupled to the working space so that the light is scanned across at least a portion of the working space over a scanning plane, the receiver being coupled to the evaluation circuit such that the switch terminates the dangerous working processes when the operator or the work tool are located within the scanning plane.

17. The apparatus of claims 16 further including means for pivoting the rotational light sensor with respect to a horizontal plane to thereby adjust an inclination angle between the scanning plane and the horizontal plane.

\* \* \* \* \*